United States Patent [19]
Van Herten

[11] 4,109,134
[45] Aug. 22, 1978

[54] POWER CONTROL CIRCUIT AND ELECTRO(PHOTO)GRAPHIC APPARATUS EMPLOYING SAME

[75] Inventor: Jozef Marie Van Herten, Venlo, Netherlands

[73] Assignee: Oce-van der Grinten N.V., Venlo, Netherlands

[21] Appl. No.: 710,398

[22] Filed: Aug. 2, 1976

[30] Foreign Application Priority Data

Aug. 8, 1975 [NL] Netherlands .......................... 7509461

[51] Int. Cl.² .......................... H05B 1/00; H05B 1/02
[52] U.S. Cl. ..................... 219/216; 219/497; 219/499; 219/501; 219/502; 219/505
[58] Field of Search ............... 219/216, 494, 497, 499, 219/501, 502, 504, 505; 361/100, 103, 106; 307/310, 252 B; 324/51; 340/225, 410, 411

[56] References Cited
U.S. PATENT DOCUMENTS

| | | | |
|---|---|---|---|
| 3,327,096 | 6/1967 | Bernous ........................... | 219/499 X |
| 3,373,262 | 3/1968 | Howell ............................... | 219/497 |
| 3,532,855 | 10/1970 | Van Cleave ...................... | 219/216 |
| 3,705,289 | 12/1972 | Szostak et al. .................... | 219/216 |
| 3,737,765 | 6/1973 | Lee et al. .......................... | 340/410 |
| 3,907,380 | 9/1975 | Flesscher et al. .................. | 340/410 |

*Primary Examiner*—C. L. Albritton
*Attorney, Agent, or Firm*—Albert C. Johnston

[57] ABSTRACT

A circuit for controlling the power transmitted from an a.c. voltage source by a switching element, particularly a triac, connected in series with a power element, e.g. with the heating element of an image fixing device in an electro(photo)graphic copier, is safeguarded against errant operation by the provision of a checking circuit which comprises means for blocking periodically the transmission of power by the switching element under its normal control and means effective in intervals of the interruption of said transmission by the blocking means for detecting whether power is then being transmitted to the power element and, if it then is, producing a corrective control signal.

10 Claims, 4 Drawing Figures

POWER CONTROL CIRCUIT AND ELECTRO(PHOTO)GRAPHIC APPARATUS EMPLOYING SAME

This invention relates to a circuit for controlling the power transmitted by a switching element, particularly a triac, connected in series with a power element on an a.c. voltage source.

The application of such a control circuit in the power circuit of a thermostat is described, for instance, in Radio Electronica, No. 22, (1971) at pages 907–908. The thermostat circuit comprises a resistor having a Negative Temperature Coefficient (NTC), with which the temperature of a liquid is measured, and a heating element for heating the liquid to the desired temperature. As soon as the temperature of the liquid reaches the desired value, the current supply to the heating element is reduced in a manner keeping the temperature at this desired value. The thermostat comprises a measuring circuit and a power control circuit. In the measuring circuit the voltage over the NTC-resistor is compared with the voltage in the output of a variable potentiometer, which adjusted voltage determines the temperature value that is to be stabilized. When the voltage over the NTC-resistor is higher than the adjusted voltage, the temperature of the liquid is too low, and the voltage difference causes the generation in the measuring circuit of a current which causes a lamp to burn. The light of this lamp falls on two light-sensitive resistors included in the power control circuit. This light forms the only connection between the measuring circuit and the control circuit. The intensity of the light determines the value of the current supply to the heating element, which current is transmitted through the heating element via a thyristor in the control circuit.

That known thermostat is useful in cases, such as for heating water baths, oil baths and developer baths (for instance in silver halide photography), in which the temperature of a liquid must be brought to and kept at a certain value. Circuits of the kind described are also known for use in electrophotography, for instance as described in U.S. Pat. Nos. 3,327,096 and 3,532,855 which relate to xerographic copying apparatus provided with a fixing device in which a loose powder image is fused on a support material, usually paper, by heating the image.

The known circuits above mentioned, however, have the disadvantage that if the control circuit or the switching element becomes defective, power is supplied continually to the heating element with the result that the temperature rises continuously in the device of which the heating element forms a part. This may have extremely detrimental consequences, especially in the case of fixing devices in electro(photo)graphic copying apparatus. In the least unfavorable case, the paper with the loose powder image only carbonizes. In worse cases, the paper can catch fire, which may also cause the copying apparatus to catch fire. Moreover, as the heat continues to increase it may damage parts of the copying apparatus in the vicinity of the heating element, and some of these parts ultimately may even catch fire.

The object of the present invention is to provide a power control circuit which obviates the disadvantage mentioned above.

According to the invention, a circuit of the kind mentioned at the outset hereof is provided with means by which the power transmission is temporarily blocked at intervals and also with means for detecting any power transmitted by the switching element notwithstanding the blocking.

The invention relates particularly to a circuit of the kind mentioned in which a sensor acts in response to power dissipation by the power element, and in which the means intermittently blocking the power transmission comprise pulse-generating means which periodically emit a blocking pulse that corresonds with a signal of the sensor for blocking the switching element.

Consequently, a safety feature is incorporated in the circuit whereby the functioning of the control circuit and of the switching element, which both control the power to be transmitted to the power element, is regularly checked by periodically simulating such a condition the sensor would require to direct the switching element into a blocking condition and thus cause no further power to be transmitted to the power element. Detecting means are used to check whether this condition actually exists. If power is still transmitted in spite of this blocking signal, the power element, or possibly the whole apparatus, is switched off in response to a signal emitted by the detecting means.

The detecting means to be utilized in the circuit preferably comprise (a) voltage detectors connected in parallel to the power element and which emit a signal if a voltage drop exists over the power element, and (b) signal combining means by which the blocking pulse and a detecting signal are combined.

The means for generating the blocking pulse preferably comprise two pulse generators, the first of which emits a pulse of at least a half period and the second of which emits a pulse of at least one full period of the alternating current. The second pulse starts at the moment when the first pulse stops, and the output of only the second pulse generator is connected with the signal combining means.

A voltage detector highly suitable for utilization according to the invention is provided by a combination of an LED (= light emitting diode) with a light-sensitive transistor.

Any suitable instrument can be used as the switching element in the circuit, such, for example, as a switch, a transistor, a thyristor or a triac.

The sensor used in the circuit may also be of various forms or kinds, depending upon the range within which or the purpose for which the circuit according to the invention is used. Besides temperature-sensitive sensors, such as thermocouples and PTC- or NTC-resistors, it is also possible to use a photosensitive sensor. A photo- or light-sensitive sensor can be used, for instance, in a cultivating test, whereby certain plants, fungi or the like are exposed to a certain quantity of light or heat.

The safety circuit according to the present invention is especially advantageous for use in cases in which the power element is a heating element and the sensor is a temperature dependent resistor. Fixing devices of electro(photo)graphic copying apparatus represent a special example of the beneficial application of the invention. Consequently the invention also relates to an electro(photo)graphic copying apparatus having a heat-fixing device the power supply of which is controlled by a circuit according to the invention.

The invention will now be further described with reference to certain embodiments thereof which are illustrated schematically in the accompanying drawings, in which.

Figure 1:
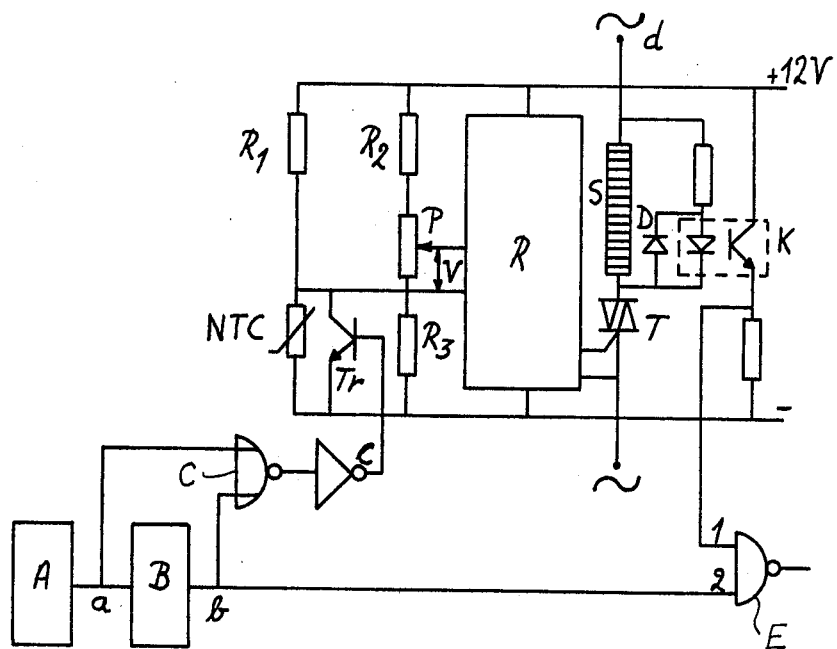
FIG. 1 is a block diagram of a circuit embodying the invention.
Figure 2:
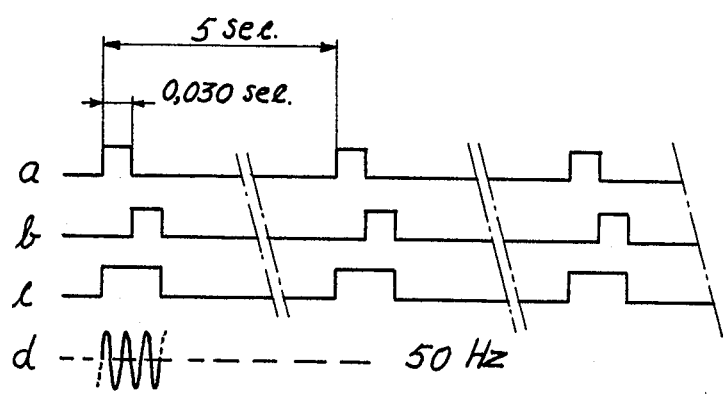
FIG. 2 is a diagram of pulses formed and of a related alternating current.

In the circuit according to the invention as shown in FIG. 1, S represents a heating element, for instance the heating element of a heat-fixing device in an electrophotographic copying apparatus, the temperature of which is sensed by an NTC-resistor which is included in a leg of a bridge circuit that also contains three resistors R1, R2 and R3 and a potentiometer P. The bridge voltage V is supplied to a control circuit R which is known per se; for instance, circuit R may be a control device of R.C.A. Corp. identified as IC CA 3059 or 3079. The circuit R in turn, depending upon the temperature sensed by the NTC-resistor, brings a switching element T, in this case a triac, into conductance so that a current can flow through the heating element S. The bridge is adjusted by varying the setting of the potentiometer P. The control circuit also contains an a-stable multivibrator A, which emits pulses having a pulse time of about 30 milliseconds and a repeat interval of about 5 seconds, as diagrammed by line $a$ in FIG. 2. On the negative edge of each of these pulses a monostable multivibrator B is started, which multivibrator also emits a pulse of 30 milliseconds duration at a repeat interval of 5 seconds, as diagrammed by line $b$ in FIG. 2. The pulses $a$ and $b$ are combined in the NOR gate C shown in FIG. 1, and subsequently inverted, to obtain a combined pulse or signal $c$ of the form indicated by line $c$ in FIG. 2.

The combined pulse or signal $c$ acts in a transistor Tr to create in it a conductive condition shorting the output of the NTC-resistor. This is done to simulate a condition that exists if the temperature sensed by the NTC-resistor is very high. Consequently, the control circuit blocks, or interrupts the operation, of the triac T so that no current passes through the heating element S, which is connected to the a.c. voltage source $d$. In consequence there will also be no voltage over element S, and no current will flow in the LED element of an opto-coupler K which also contains a light-sensitive transistor connected to a 12 V d.c. voltage source. This transistor therefore will be high-ohmic, so that the emitter will be kept almost at zero volt. Consequently, the input 1 of the NAND gate E is low, and, although the input 2 of this gate from pulse $b$ becomes high at a given moment, the output of the NAND gate does not change.

When the control circuit R or the triac T is defective, the heating element S will be conducting, even when signal $c = 1$, as a result of which the LED in the opto-coupler becomes conductive, the light-sensitive transistor consequently becomes low-ohmic and a relatively high voltage level occurs on the input 1 of the NAND gate. Since the input 2 also becomes high by reason of pulse $b$, both of the inputs of the signal combining NAND gate E are now high, so that the output of this gate temporarily becomes low. This temporarily changed output signal can be utilized to activate or to switch off any of various devices. For instance, the heating element in the fixing device of a copying apparatus, or the whole of such apparatus if so desired, can be switched off in response to this signal.

The pulse $b$ may become high only at a moment later than signal $c$, as the triac may have been triggered just before, as a result of which the triac may remain conducting for half a period. Moreover, delay times may play a role in the control circuit. A delay time of 30 milliseconds between the leading edges of pulses $b$ and $c$ appears to be sufficient. The pulse $b$ must also be sufficiently long in duration to induce current flow through the LED. In this regard also, a time of about 30 milliseconds has appeared to be sufficient.

The diode D serves to prevent the blocking voltage over the LED from becoming too high.

It is possible in practice to have an interfering pulse function as a blocking pulse. In many cases the interfering pulse may be of shorter duration than the programmed duration of the blocking pulse, and may sometimes even be shorter than the duration of a half period of the a.c. voltage.

In such practices, there is a risk that the power element may be switched off in error, due to too early a checking of whether or not the switching element is transmitting power; for this checking starts at the moment when the blocking pulse ends. If the duration of an interfering pulse functioning as blocking pulse is so short that the sinuosidal alternating current has not yet passed its zero point at the end of this interfering-blocking pulse, it may occur that the switching element is still transmitting power in full accordance with the required operation. Since from this moment the switching element is also checked with regard to the non-transmission of power, and since at this checking it appears that the element is indeed transmitting power, the safety control will become operative and the power element will be switched off.

In order to prevent this, the circuit can be modified so as to assure that the checking on the non-transmission of power through the switching element does not start earlier than after a pre-selected constant time has expired from the beginning of the blocking pulse, or of the interfering-blocking pulse, which time is sufficiently long to be sure that the switching element properly no longer transmits power. If then, during the checking, it is observed that the switching element still transmits power, then it is evident that this is occurring improperly and that a subsequent switching off of the power element is in order.

Figure 3:
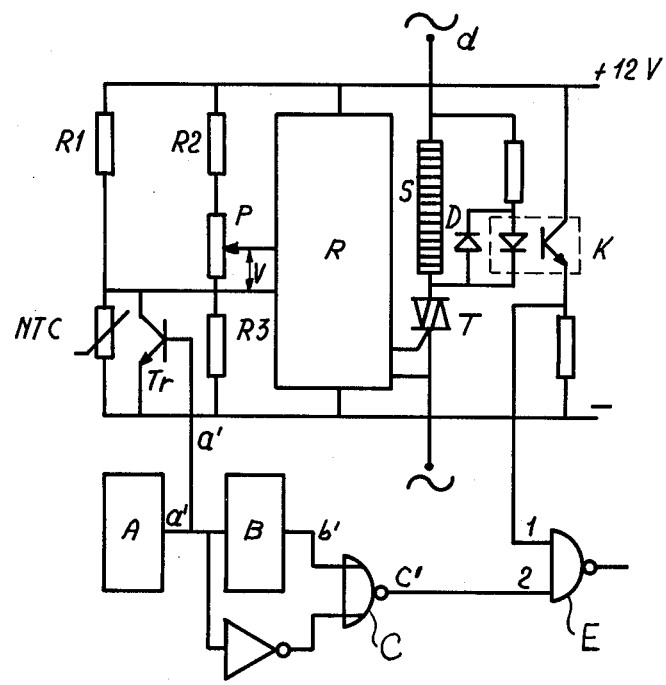
FIG. 3 is a block diagram of a modified circuit according to the invention.

Assurance that the check on the non-transmission of power through the switching element starts only after a certain and sufficiently long time has passed from the beginning of the blocking pulse, or of the interfering-blocking pulse, can be obtained by a modification of the circuit of FIG. 1, as illustrated in FIG. 3. The components of the modified circuit correspond to those of FIG. 1 except in the respects now to be explained.

Figure 4:
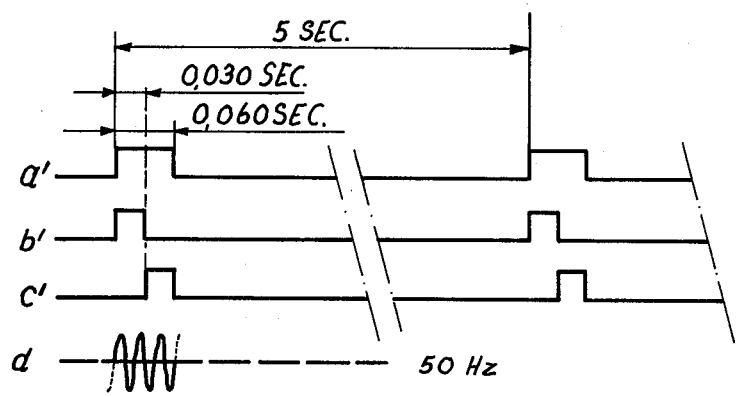
FIG. 4 is a diagram of pulses formed in the embodiment of FIG. 3.

The a-stable multivibrator A in FIG. 3, whether or not as induced by an interfering pulse, emits a blocking pulse $a'$, for intance of 60 milliseconds duration at intervals of 5 seconds as represented by line $a'$ in FIG. 4. This pulse $a'$ is utilized for the function achieved by the pulse $c$ in FIG. 1. At the same moment of the beginning of each pulse $a'$, i.e., in coincidence with an upward leg of the line $a'$, the monstable multivibrator B is started for the emission of a pulse $b'$ of constant duration, for instance 30 milliseconds as represented by line $b'$ in FIG. 4. Only after these 30 milliseconds, i.e., in coincidence with a downward leg of line $b'$, pulse $c'$ is started, also with a duration of 30 milliseconds, during which time the checking occurs to detect whether the triac T is indeed blocked, i.e., is not transmitting any power.

The influence of an interfering pulse, at least as concerns its duration, is eliminated by the circuit of FIG. 3. If the pulse $a'$ is a very short interfering pulse, i.e., if its duration is shorter than or equal to that of pulse $b'$, no pulse $c'$ is produced, so that no checking occurs to determine whether the switching element T is blocked. Pulse $b'$ in this circuit must at least be equal in duration to a half period of the a.c. voltage, which at 50 Hz is 10 milliseconds. A time longer than this may be provided in connection with delay times which can play a role in the circuit, and in the present embodiment a duration of 30 milliseconds has appeared to be favorable. Pulse $c'$ exists only when pulse $a'$ lasts longer than pulse $b'$. The duration of pulse $c'$, during which time the checking is effected as to whether the switching element is really blocked, can be very short, depending upon any delays which may occur in other components of the circuit. Since the present embodiment makes use of a light-emitting diode (LED), in which the current can flow only in one direction, it may happen that the checking is effected during the non-conductive phase of the voltage over the LED. For that reason, pulse $c'$ must last at least a half period of the a.c. voltage, i.e., at least 10 milliseconds in the case of a current supply at 50 Hz. To this mimimum duration some time needs be added in order to assure that the voltage over the LED can surpass a certain threshold required for the current measurements. After a quarter of a period (i.e., 5 milliseconds) the voltage will have reached its maximum, so that in this case it is desirable to give pulse $c'$ a duration of at least $10 + 5 = 15$ milliseconds, and a duration of 30 milliseconds has appeared to give the most favorable results.

What is claimed is:

1. A safety circuit for controlling the power transmitted by a switching element connected in series with a power element on an a.c. voltage source, said switching element forming part of a control circuit for regulating the current supply to the power element, comprising in addition to said control circuit means for blocking periodically the transmission of power by said switching element under control by said control circuit and means effective in intervals of the interruption of said transmission by said blocking means for detecting whether power is then being transmitted to the power element.

2. A safety circuit for controlling the power transmitted by a switching element connected in series with a power element on an a.c. voltage source, said switching element forming part of a control circuit for regulating the current supply to the power element, comprising in addition to said control circuit means for blocking periodically the transmission of power by said switching element under control by said control circuit, means effective in intervals of the interruption of said transmission by said blocking means for detecting whether power is then being transmitted to the power element, and a sensor operative to emit a current signal in response to power dissipation in said power element, said blocking means comprising pulse generating means which periodically emit a blocking pulse corresponding with said current signal of the sensor for blocking the switching element.

3. A circuit according to claim 2, said detecting means comprising voltage detectors connected in parallel to said power element and which emit a current signal when a voltage drop exists over said power element, and means for combining a said blocking pulse and a said current signal to produce a control signal.

4. A circuit according to claim 3, said pulse generating means including two pulse generators the first of which emits a pulse lasting for at least a half period of the a.c. voltage of said source and the second of which emits a pulse starting at the moment when the pulse of the first generator stops and lasting for at least one full period of said voltage, and the output of only the second pulse generator being connected with the combination means.

5. A circuit according to claim 3, said pulse generating means including two pulse generators the first of which emits a pulse lasting for more than a half period of the a.c. voltage of said source and the second of which emits a pulse starting at the same moment as the pulse of the first generator and lasting for at least a half period of said voltage, and the outputs of the two pulse generators being connected with the combination means.

6. A circuit according to claim 3, said voltage detectors comprising a LED and a transistor responsive to light from said LED.

7. A circuit according to claim 2, said power element being a heating element and said sensor being a temperature-responsive resistor.

8. A safety circuit for controlling the power transmitted by a triac connected in series with a heating element on an a.c. voltage source and including a sensor operative to emit a current signal in response to heat dissipation of said heating element, said triac forming part of a control circuit for regulating the current supply to the heating element, comprising means for blocking periodically the transmission of power by said triac under control by said control circuit and means effective in intervals of the interruption of said transmission by said blocking means for detecting whether power is then being transmitted to said heating element, said detecting means comprising a LED connected in parallel to said heating element and a transistor responsive to light from said LED to emit a current signal when a voltage drop exists over said heating element, said blocking means comprising pulse generating means which emit a blocking pulse corresponding with a current signal of the sensor, and means for combining said blocking pulse and a said current signal of the detecting means to produce a control signal.

9. An electro(photo)graphic copying apparatus comprising a device for fixing images by heating them and a safety circuit for controlling the power transmitted by a switching element connected on a a.c. current source in series with a heating element of said device, said switching element forming part of a control circuit for regulating the current supply to said heating element, said safety circuit comprising means for blocking periodically the transmission of power by said switching element under control by said control circuit and means effective in intervals of the interruption of said transmission by said blocking means for detecting whether power is then being transmitted to the heating element.

10. An electro(photo)graphic copying apparatus comprising a device for fixing images by heating them and a safety circuit according to claim 8 for controlling the heating by said fixing device.

* * * * *